US010543598B2

(12) United States Patent
Petty

(10) Patent No.: US 10,543,598 B2
(45) Date of Patent: Jan. 28, 2020

(54) MACHINING SYSTEM WITH OPTIMAL PATHS

(71) Applicant: The Boeing Company, Chicago, IL (US)

(72) Inventor: Nathan Lee Petty, Summerville, SC (US)

(73) Assignee: The Boeing Company, Chicago, IL (US)

( * ) Notice: Subject to any disclaimer, the term of this patent is extended or adjusted under 35 U.S.C. 154(b) by 127 days.

(21) Appl. No.: 15/904,554

(22) Filed: Feb. 26, 2018

(65) Prior Publication Data

US 2019/0265672 A1  Aug. 29, 2019

(51) Int. Cl.
*B25J 9/16* (2006.01)
*G05B 19/31* (2006.01)
(Continued)

(52) U.S. Cl.
CPC .......... *B25J 9/1687* (2013.01); *B23Q 9/0042* (2013.01); *B23Q 16/00* (2013.01); *B23Q 17/2233* (2013.01); *B25J 9/1669* (2013.01); *B64F 5/50* (2017.01); *G05B 19/31* (2013.01); *G05B 19/402* (2013.01); *B64F 5/10* (2017.01);
(Continued)

(58) Field of Classification Search
CPC ........... Y10T 29/49778; Y10T 29/4978; Y10T 29/53048; Y10T 29/53052; Y10T 29/53061; Y10T 29/53065; Y10T 408/03; Y10T 408/173; Y10T 408/175; Y10T 483/10; Y10T 483/1736; G05B 19/4097;
(Continued)

(56) References Cited

U.S. PATENT DOCUMENTS 2,738,692 A * 3/1956 Jones ............... B21D 22/00
408/11
2,886,077 A * 5/1959 Rafferty ............ B25B 23/04
81/430
(Continued)

FOREIGN PATENT DOCUMENTS

EP   3335843 A1   6/2018

OTHER PUBLICATIONS

European Patent Office Extended Search Report, dated Jul. 15, 2019, regarding Application No. 19159214.6, 11 pages.

*Primary Examiner* — Crystal J Barnes-Bullock
(74) *Attorney, Agent, or Firm* — Yee & Associates, P.C.

(57) ABSTRACT

A method for implementing machining operations for a workpiece. Pre-existing hole locations for temporary fasteners in the workpiece requiring a clamp-up force for performing the machining operations to form holes in the workpiece is identified. A set of the pre-existing hole locations is determined from the pre-existing hole locations that results in an optimal path for performing the machining operations on the workpiece taking into account clamp-up force specifications for the workpiece. The optimal path has a near-minimum distance. An ordered sequence for performing the machining operations to form the holes at hole locations is determined that has the optimal path. Robotic control files that causes robotic devices to perform the machining operations using the optimal path is created. The robotic devices are operated using the robotic control files to form the holes in the ordered sequence using the optimal path that takes into account the clamp-up force specifications.

20 Claims, 11 Drawing Sheets

(51) Int. Cl.
*G05B 19/402* (2006.01)
*B23Q 9/00* (2006.01)
*B64F 5/50* (2017.01)
*B23Q 16/00* (2006.01)
*B23Q 17/22* (2006.01)
*B64F 5/10* (2017.01)
*G05B 19/4097* (2006.01)

(52) U.S. Cl.
CPC .............. *G05B 19/4097* (2013.01); *G05B 2219/31281* (2013.01); *G05B 2219/40523* (2013.01); *Y10S 901/02* (2013.01); *Y10T 29/4978* (2015.01); *Y10T 29/49778* (2015.01); *Y10T 29/53048* (2015.01); *Y10T 29/53052* (2015.01); *Y10T 29/53061* (2015.01); *Y10T 29/53065* (2015.01); *Y10T 408/03* (2015.01); *Y10T 408/173* (2015.01); *Y10T 408/175* (2015.01); *Y10T 483/10* (2015.01); *Y10T 483/1736* (2015.01)

(58) Field of Classification Search
CPC ... B23Q 9/0042; B23Q 16/00; B23Q 17/2233
See application file for complete search history.

(56) References Cited

U.S. PATENT DOCUMENTS

| | | | | |
|---|---|---|---|---|
| 2,895,516 | A * | 7/1959 | Mayer | B23D 61/006 144/80 |
| 2,911,868 | A * | 11/1959 | Thomson, Jr. | B23Q 16/00 82/117 |
| 3,162,097 | A * | 12/1964 | Allen | B25C 1/041 91/399 |
| 4,636,938 | A * | 1/1987 | Broome | G05B 19/4097 700/180 |
| 6,505,393 | B2 * | 1/2003 | Stoewer | B21J 15/10 29/243.53 |
| 6,855,099 | B2 * | 2/2005 | Hazlehurst | B21C 51/005 29/281.5 |
| 8,920,063 | B1 * | 12/2014 | Easley | F16B 21/165 269/48.1 |
| 2016/0378093 | A1 | 12/2016 | Freeman et al. | |
| 2018/0164775 | A1 * | 6/2018 | Crivella | G05B 19/402 |

\* cited by examiner

MACHINING SYSTEM WITH OPTIMAL PATHS

BACKGROUND INFORMATION

1. Field

The present disclosure relates generally to manufacturing objects and, in particular, to performing machining operations on a workpiece for an object using optimal paths.

2. Background

Manufacturing an object, such as an aircraft, involves performing manufacturing operations on thousands or millions of parts. These manufacturing operations, for example, include drilling holes, installing fasteners, machining surfaces, installing wiring harnesses, inspections, and other types of manufacturing tasks performed to manufacture an aircraft.

In assembling parts to form an aircraft, manufacturing operations are performed that include forming holes in parts for the aircraft. The manufacturing operations also include installing fasteners within the holes. These types of manufacturing operations may be performed using robotic devices that are programmed to perform these different manufacturing operations.

A programmer creates a program used by the robotic device to perform the manufacturing operations. The program is a file that includes instructions on locations for performing the manufacturing operations on a workpiece and defining a path for performing the manufacturing operations. For example, when the manufacturing operations involve machining holes, the path can specify such that the holes are formed in a particular order.

The order in which the holes are machined may take into account some factors or constraints. For example, a constraint may be present in machining holes in a workpiece based on specifications defining where a clamp-up force is needed when forming a hole in the workplace.

For example, with a barrel fuselage, layers of skin may be placed against structural components such as a frame, longerons, or other components in which holes are machined to connect the components to each other. Specifications can specify that some locations require a clamp-up force prior to forming a hole at a particular location.

This type of force can be provided in a number of different ways. For example, temporary fasteners may be installed in already formed holes to provide the desired clamp-up force to machine additional holes in the workpiece in a manner that meets specifications for clamp-up forces for the workpiece. The clamp-up forces provided by the temporary fasteners can increase the quality of holes. For example, with a clamp-up force, less deflections may be between the components in the workpiece at the machining locations, resulting in higher quality holes.

Identifying a shortest length path that meets clamp-up force specifications can be more difficult than desired for a person creating a program for use by robotic devices to machine holes. The difficulty increases as the number of holes to be machined in a workpiece increases. For example, creating a program to machine thousands of holes in the workpiece with an optimal path can be challenging.

Therefore, it would be desirable to have a method and apparatus that take into account at least some of the issues discussed above, as well as other possible issues. For example, it would be desirable to have a method and apparatus that overcome a technical problem with machining holes that extend through components in a workpiece with an optimal path.

SUMMARY

An embodiment of the present disclosure provides a method for implementing machining operations for a workpiece. A plurality of pre-existing hole locations for a number of temporary fasteners in the workpiece requiring a clamp-up force for performing the machining operations to form a plurality of holes in the workpiece is identified. A set of the pre-existing hole locations for the number of temporary fasteners from the plurality of pre-existing hole locations that results in an optimal path for performing the machining operations to form the plurality of holes in the workpiece taking into account clamp-up force specifications for the workpiece is determined, wherein the optimal path has a near-minimum distance. An ordered sequence is determined for performing the machining operations to form the plurality of holes at a plurality of hole locations in the workpiece that has the optimal path for the machining operations. A number of robotic control files is created that causes a number of robotic devices to perform the machining operations using the optimal path to form the plurality of holes at the plurality of hole locations in the workpiece. The number of robotic devices is operated using the number of robotic control files for performing the machining operations to form the plurality of holes in the ordered sequence using the optimal path that takes into account the clamp-p force specifications for the workpiece.

Another embodiment of the present disclosure provides a manufacturing system comprising a computer system, an operations manager running on the computer system, and a number of robotic devices. The operations manager identifies a plurality of pre-existing hole locations for a number of temporary fasteners in a workpiece requiring a clamp-up force for performing machining operations to form a plurality of holes in the workpiece; determines a set of the pre-existing hole locations for the number of temporary fasteners from the plurality of pre-existing hole locations that results in an optimal path for performing the machining operations to form the plurality of holes at a plurality of hole locations in the workpiece, wherein the optimal path has a near-minimum distance; determines an ordered sequence for performing the machining operations to form the plurality of holes in the workpiece that has the optimal path for the machining operations; and creates a number of robotic control files that causes the number of robotic devices to perform the machining operations using the optimal path to form the plurality of holes at the plurality of hole locations in the workpiece. The number of robotic devices running the number of robotic control files for performing the machining operations to form the plurality of holes in the ordered sequence using the optimal path that takes into account clamp-up force specifications for the workpiece.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the current techniques for controlling robotic devices in machining holes often does not provide a desired amount of efficiency or cost reduction in manufacturing an object such as an aircraft. For example, current techniques for creating paths do not optimize the path length when taking into account clamp-up forces that may be needed. Further, the illustrative embodiments also recognize and take into account that current techniques for creating paths for machining holes do not take into account tool changes or other factors that may increase the amount of time needed to perform machining operations.

Thus, the illustrative embodiments provide a method, an apparatus, and a system for managing machining operations for a workpiece. In one illustration example, a method for implementing machining operations for a workpiece is present. A plurality of pre-existing hole locations is identified for a number of temporary fasteners in the workpiece requiring a clamp-up force for performing machining operations to form a plurality of holes in the workpiece. As used herein, "a number of," when used with reference to items, means one or more items. For example, "a number of temporary fasteners" is one or more temporary fasteners.

A set of the pre-existing hole locations is determined for the number of temporary fasteners from the plurality of pre-existing hole locations that results in an optimal path for performing the machining operations to form the plurality of holes in the workpiece taking into account clamp-up force specifications for the workpiece. As used herein, "a set of" when used with reference to items, means zero or more items. For example, a set of pre-existing hole locations may be zero, one, or some other number of pre-existing hole locations. In other words, the set can be an empty or null set.

The optimal path has a near-minimum distance. An ordered sequence is determined which has the optimal path for the machining operations. The optimal path is for performing the machining operations to form the plurality of holes at a plurality of hole locations in the workpiece.

A number of robotic control files is created that causes a number of robotic devices to perform the machining operations using the optimal path to form the plurality of holes at the plurality of hole locations in the workpiece. The number of robotic devices is using the robotic control files for performing the machining operations to form the plurality of holes in the ordered sequence using the optimal path that takes into account the clamp-up force specifications for the workpiece. In this manner, one or more illustrative examples enable finding an optimal path with a sequence that reduces the time needed to machine holes in the workpiece.

Figure 1:
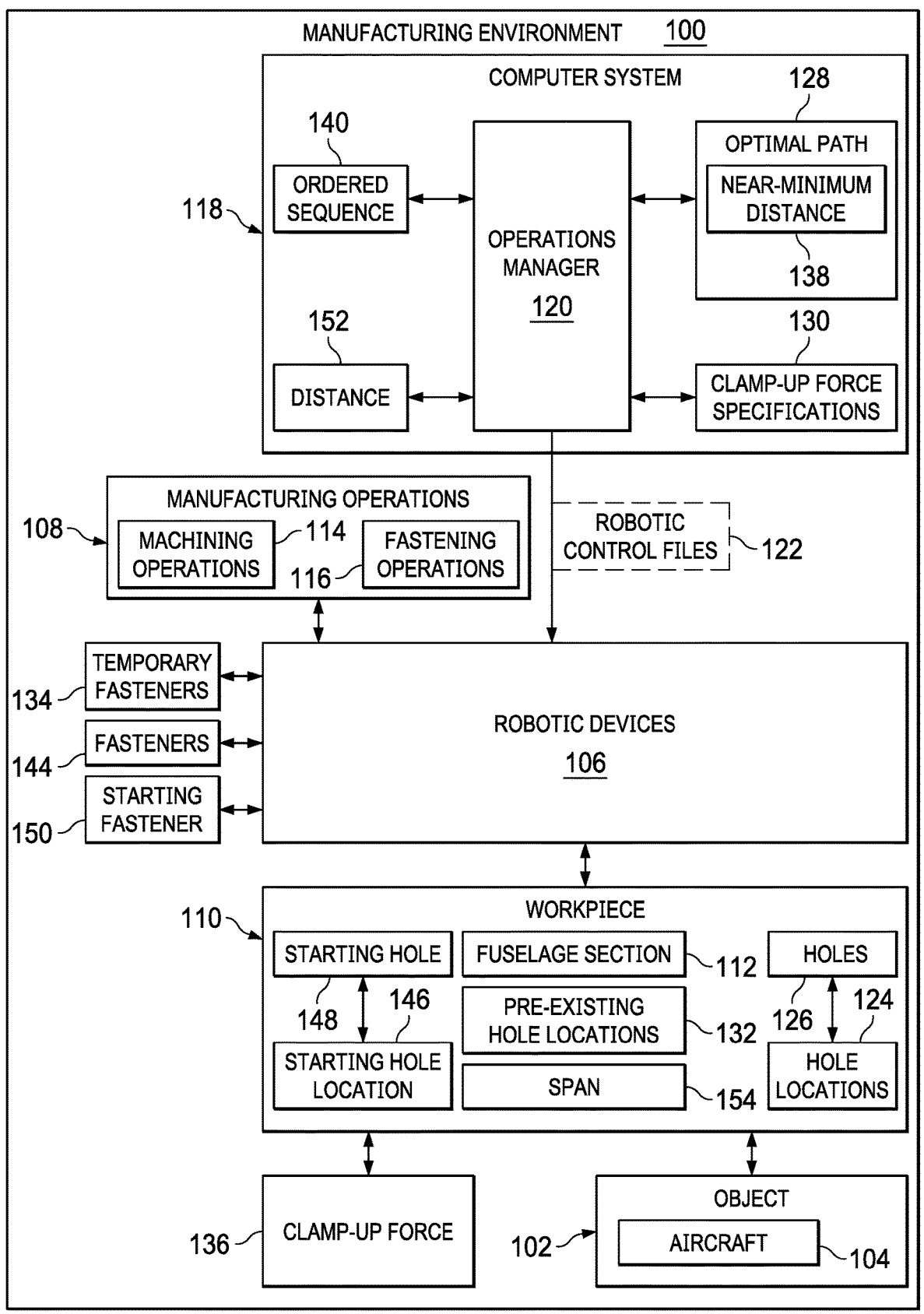
FIG. 1 is an illustration of a block diagram of a manufacturing environment in accordance with an illustrative environment.

With reference now to the figures, FIG. 1 is an illustration of a block diagram of a manufacturing environment depicted in accordance with an illustrative environment. Manufacturing environment 100 is an example of an environment in which object 102 may be manufactured. In the illustrative example, object 102 takes the form of aircraft 104.

As depicted, a number of robotic devices 106 perform manufacturing operations 108 on workpiece 110 for aircraft 104. A robotic device in robotic devices 106 is a physical machine that is configured to perform operations under the control of a processor unit. The robotic device may perform operations using a program that defines the operations to be performed. Robotic devices 106 can be selected from at least one of a robotic arm, a crawler, a drone, a six-axis robot, a computer numerical control robot, a robotic lathe, or some other suitable type of robotic device.

In this example, workpiece 110 is one or more components on which manufacturing operations 108 can be performed on workpiece 110 to form an assembly, a part, a subassembly, or some other component for aircraft 104. For example, skin panels, frames, and longerons are positioned to form workpiece 110 and are connected to each other through robotic devices 106 performing manufacturing operations 108 to form fuselage section 112 for aircraft 104. These manufacturing operations may include, for example, without limitation, at least one of machining operations 114 or fastening operations 116.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, robotic devices 106 operate under the control of computer system 118. Computer system 118 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, a mobile phone, or some other suitable data processing system.

As depicted, operations manager 120 is a component implemented in computer system 118 that operates to control the operation of robotic devices 106. In the illustrative example, operations manager 120 in computer system 118 creates robotic control files 122 that are used to control the operation of robotic devices 106 to perform manufacturing operations 108. In this illustrative example, each robotic device in robotic devices 106 can receive a robotic control file in robotic control files 122. A robotic control file comprises instructions to perform operations. For example, the robotic control file can be a program such as a numeric control file, and the robotic device can be a computer numerical control (CNC) machine.

In this illustrative example, computer system 118 identifies manufacturing operations 108 to be performed on workpiece 110. The identification of manufacturing operations 108 can be performed any number of ways. For example, at least one of a computer-aided design model, specifications, or other information can be used to identify manufacturing operations 108. For example, a computer-aided design model and specifications for aircraft 104 can be used to identify hole locations 124 for holes 126 in workpiece 110.

In this illustrative example, operations manager 120 enables identifying optimal path 128 for performing machining operations 114 to form holes 126 in hole locations 124. Optimal path 128 is identified in a manner that takes into account clamp-up force specifications 130 for workpiece 110. For example, workpiece 110 can be skin panels, frames, and longerons that are positioned to be connected to each other to form a fuselage assembly with layers for aircraft 104. In this illustrative example, optimal path 128 is a path for performing machining operations 114 that takes the least amount of time. Reducing the amount of time may include selecting optimal path 128 to be at least one of a shortest path, having a least number of tool changes, having the least number of positioning stations for robotic devices, or some other factor that may affect the amount of time needed to perform machining operations 114.

As depicted, operations manager 120 identifies a plurality of pre-existing hole locations 132 for a number of temporary fasteners 134 in workpiece 110 requiring clamp-up force 136 for performing machining operations 114 to form a plurality of holes 126 in workpiece 110. In this illustrative example, the pre-existing hole location is a location in which a hole can be present for installing a temporary fastener. As depicted, the pre-existing hole location is present prior to performing machining operations 114 at hole locations 124 in workpiece 110 to form holes 126.

In this illustrative example, operations manager 120 causes a minimum number of temporary fasteners 134 to be installed in the set of pre-existing holes at locations that have an associated constraint requiring a clamp-up force 136 for securely holding together parts that are layered or overlapping, before performing manufacturing operations (machining or drilling of holes, subsequent installation of fasteners, etc.). Utilizing a minimum number of temporary fasteners 134 to be installed enables more hole locations to be accessible for machining operations to be performed, and also may reduce the time needed for manufacturing operations 108 on workpiece 110. As depicted, machining operations 114 can be performed utilizing a number of robotic devices 106.

As depicted, operation manager 120 identifies a set of pre-existing hole locations 132 for installation of the number of temporary fasteners 134 taking into account hole locations that have an associated constraint requiring a clamp-up force 136. The set of pre-existing hole locations 132 is identified from the plurality of pre-existing hole locations 132. The set can be all of pre-existing hole locations 132 or none of pre-existing hole locations 132. In other words, the set can be a null or empty set.

In this illustrative example, the set of temporary fasteners 134 is installed in the set of pre-existing hole locations to provide clamp-up force 136 on workpiece 110 in a manner that meets clamp-up force specifications 130 for machining holes 126 in hole locations 124. The set of pre-existing hole locations 132 is determined in a manner that results in optimal path 128 for performing machining operations 114 to form the plurality of holes 126 in workpiece 110 taking into account clamp-up force specifications 130 for workpiece 110. The optimal path represents a tool path for which the robotic device can perform manufacturing operations from hole location to hole location, where the optimal path has a near-minimum distance spanning a plurality of hole locations from a start location to a finish location.

If the set of temporary fasteners 134 is an empty set, operations manager 120 can identify starting hole location 146 on workpiece 110. Starting hole location 146 can be part of hole locations 124 for the plurality of holes 126 or a separate hole for purposes of providing needed clamp-up force 136 to meet clamp-up force specifications 130. In other words, machining operations 114 can begin by machining at starting hole location 146 in the plurality of hole locations 124 to form starting hole 148 and meet clamp-up force specifications 130 in some implementations.

As depicted, starting fastener 150 can be installed in starting hole 148. With starting fastener 150 in starting hole 148, operations manager 120 can identify the path such that starting hole 148 results in optimal path 128 for machining operations 114 to form the plurality of holes 126 in workpiece 110 in which optimal path 128 has near-minimum distance 138. Operations manager 120 can create the number of robotic control files 122 that causes the number of robotic devices 106 to perform machining operations 114 using optimal path 128 to form starting hole 148 and the plurality of holes 126 in workpiece 110.

In the illustrative example, optimal path 128 has near-minimum distance 138. Near-minimum distance 138 is a distance that is within a bound or range for the minimum distance. The bound may be selected based on factors selected from at least one of time to perform machining operations, cost, or other suitable factors. Further, optimal path 128 reduces at least one of a distance of the path, a number of tool changes, the number of robotic devices, or some other metric for measuring performance in machining of holes 126 in workpiece 110.

Operations manager 120 determines ordered sequence 140 for performing machining operations 114 to form the plurality of holes 126 at the plurality of hole locations 124 in workpiece 110. In this illustrative example, ordered sequence 140 is a sequence that has optimal path 128 for machining operations 114.

As depicted, operations manager 120 creates a number of robotic control files 122 that causes a number of robotic devices 106 to perform machining operations 114 using optimal path 128 to form the plurality of holes 126 at the plurality of hole locations 124 in the workpiece 110. For example, the number of robotic control files 122 can be a number of computer numerical control (CNC) programs.

In the illustrative example, ordered sequence 140 can be determined for a number of robotic devices 106. Each of the number of robotic devices 106 can be assigned a subset of the plurality of hole locations 124 for performing machining operations 114. For example, operations manager 120 can determine a set of pre-existing hole locations 132 at which a minimum number of temporary fasteners 134 are to be installed by determining a subset of the plurality of hole locations 124 for each of the number of robotic devices 106 to perform machining operations that will result in optimal path 128 having near-minimum distance 138 for each determined subset of the plurality of hole locations 124. In this example, determining the subset of the plurality of hole locations 124 iteratively calculates distance 152 across span 154 of hole locations 124 that meet constraints. For each subset of the plurality of hole locations 124 that will be assigned to a robotic device in robotic devices 106, the subset of hole locations includes one or more separate groups of hole locations proximally located near each other that may form a hole pattern, for example. Each of the hole locations may have an associated constraint, such as a requirement to establish a clamp-up force within a given distance of the hole location before proceeding with machining operations to drill the hole and manufacturing operations to install a fastener in the hole. Accordingly, for each subset of hole locations having a number of groups or hole patterns (as in FIG. 3A), the process may determine candidate locations among the pre-existing hole location 132 within each of the groups of hole locations in which to install temporary fasteners 134, such that clamp-up constraints are satisfied for other proximally-located hole locations and an optimum path can then be determined for each robotic device in robotic devices 106 to move from hole location to hole location within each group of hole locations. The process may determine, for each of robotic devices 106, optimal path 128 that has a near-minimum distance for traversing hole locations in each group, and for spanning the subset of hole locations from a start location to a finish location, for example.

The constraints can be clamp-up force specifications 130, hole locations 124 reachable by a robot, and other factors. Distance 152 across span 154 can be a distance matrix which defines the time cost of all movements from every possible point to every other possible point. In this illustrative example, the points are locations of holes 126.

In this illustrative example, a robotic control file is created for each robotic device in the number of robotic devices 106. If more than one robotic device is present, the robotic control file for each of robotic devices 106 defines machining operations 114 to be performed on a portion of optimal path 128. In other words, optimal path 128 may be divided up into portions that are assigned to robotic devices 106. A robotic device in the number of robotic devices 106 performs machining operations 114 on a portion of optimal path 128 assigned to the robotic device in the robotic control file in the number of robotic control files 122 for the robotic device.

In this illustrative example, operations manager 120 sends the number of robotic control files 122 to the number of robotic devices 106. The number of robotic devices 106 runs the robotic control files 122 for performing machining operations 114 to form the plurality of holes 126 in ordered sequence 140 using optimal path 128 that takes into account clamp-up force specifications 130 for workpiece 110.

Further, in creating the number of robotic control files 122, operations manager 120 can also create these control files such that the number of robotic devices 106 perform machining operations 114 using optimal path 128 to form the plurality of holes 126 and to install a plurality of fasteners 144 in the plurality of holes 126 in workpiece 110.

As depicted, operations manager 120 in computer system 118 may be implemented in software, hardware, firmware, or a combination thereof. When software is used, the operations performed by operations manager 120 may be implemented in program code configured to run on hardware, such as a processor unit. When firmware is used, the operations performed by operations manager 120 may be implemented in program code and data and stored in persistent memory to run on a processor unit. When hardware is employed, the hardware may include circuits that operate to perform the operations in operations manager 120.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In one illustrative example, one or more technical solutions are present that overcome a technical problem with machining holes extending through components in a workpiece with an optimal path. As a result, one or more technical solutions may provide a technical effect of increasing the efficiency in which machining operations can be performed. For example, the installation of temporary fasteners can increase the number of paths that can be used to machine holes on a workpiece by meeting clamp-up force specifications. The selection of locations for temporary fasteners 134 can be made to identify an optimal path performing machining operations on the workpiece. With the installation of temporary fasteners 134 in selected locations, additional paths can be opened up for performing the machining operations that meet clamp-up force specifications 130. Optimal path 128 can be selected to reduce at least one of distance traveled, tool changes, time, or other parameters with respect to efficiency. In this manner, overall flow time for performing machining operations 114 on workpiece 110 can be reduced.

As a result, computer system 118 operates as a special purpose computer system in which operations manager 120 in computer system 118 enables identifying an optimal path for performing machining operations to form holes in a workpiece. In particular, operations manager 120 transforms computer system 118 into a special purpose computer system as compared to currently available general computer systems that do not have operations manager 120.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the illustrative examples are described with respect to aircraft 104, another illustrative example may be applied to another type of object. The object may be, for example, a mobile platform, a stationary platform, a land-based structure, an aquatic-based structure, and a space-based structure. More specifically, the object may be a surface ship, a tank, a personnel carrier, a train, a spacecraft, a space station, a satellite, a submarine, an automobile, a power plant, a bridge, a dam, a house, a manufacturing facility, a building, a wing, an engine housing, a fuselage, and a skin panel.

As another example, manufacturing operations 108 may include other types of operations in addition to or in place of machining operations 114 and fastening operations 116. For example, manufacturing operations 108 also may include painting operations, inspections, measurement operations, bonding operations, welding operations, and other types of operations that can perform to manufacture object 102.

Figure 2:
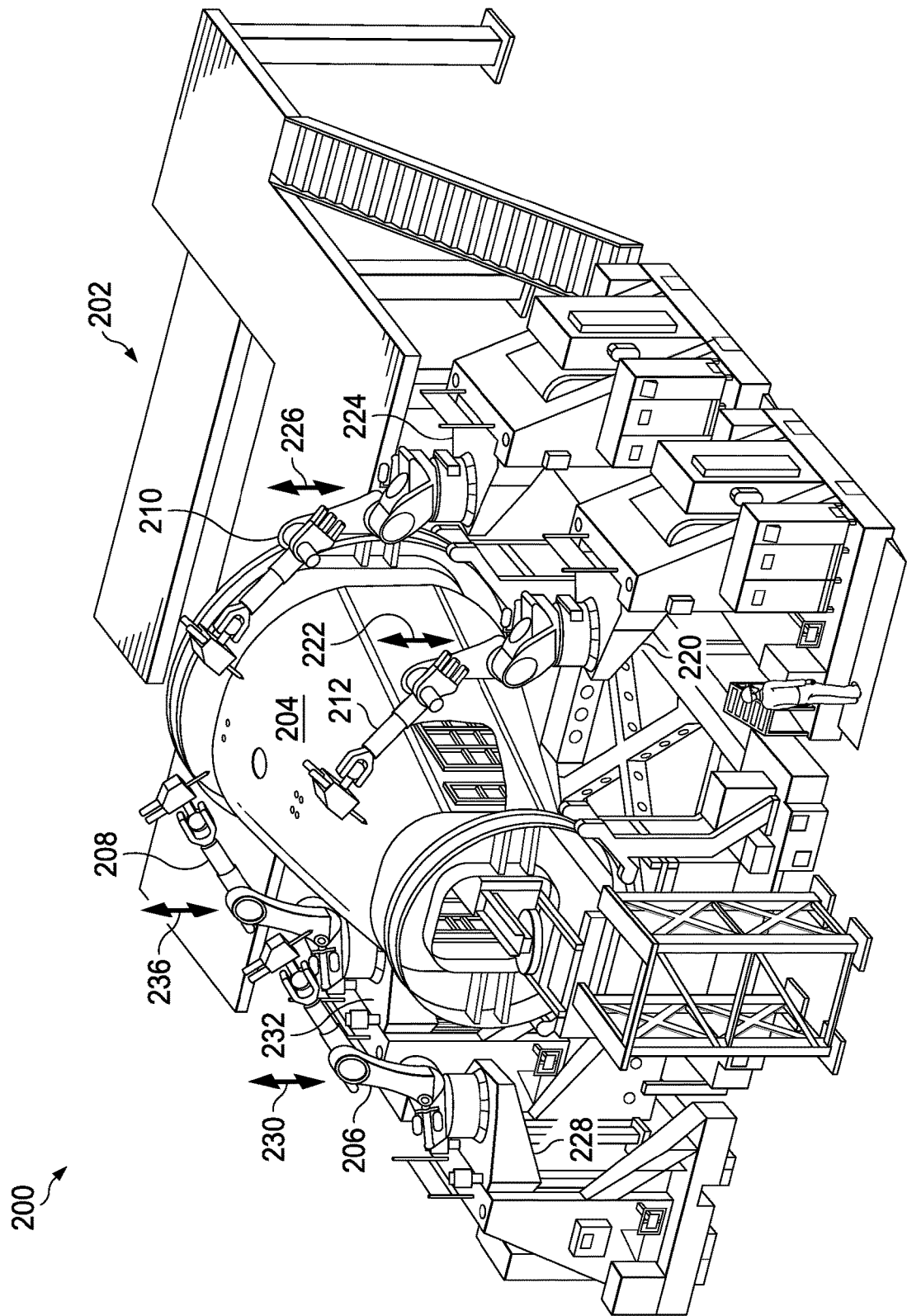
FIG. 2 is an illustration of a manufacturing environment in accordance with an illustrative embodiment.

With reference next to FIG. 2, an illustration of a manufacturing environment is depicted in accordance with an illustrative embodiment. In this illustrative example, cell 202 is shown in manufacturing environment 200. Cell 202 is a location in manufacturing environment 200 in which robotic devices can perform machining operations on a workpiece to form fuselage section 204. Fuselage section 204 is an example of a physical implementation for fuselage section 112 in FIG. 1.

As depicted, robotic devices include robotic arm 206, robotic arm 208, robotic arm 210, and robotic arm 212. These four robotic arms are examples of physical implementations for robotic devices 106 shown in block form in FIG. 1. These robotic arms perform machining operations using robotic control files, such as robotic control files 122 in FIG. 1.

In this example, each of these robotic arms can receive a robotic control file that defines a path for performing machining operations to form holes in fuselage section 204. All of these paths are portions of an optimal path for performing the machining operations on fuselage section 204 in which the optimal path takes into account clamp-up force specifications.

In this illustrative example, the current position of each robotic arm is a current position station. In these illustrative examples, the robotic arms can be configured to move to different position stations.

For example, robotic arm 212 is at position station 220. Robotic arm 212 can move in the direction of arrow 222 to reach different position stations to change the reach of robotic arm 212 on fuselage section 204. In a similar fashion, robotic arm 210 is located at position station 224. Robotic arm 210 can move in the direction of arrow 226 to reach additional positioning stations. Robotic arm 206 is located at position station 228. Robotic arm 206 can move in the direction of arrow 230 to reach additional positioning stations. Robotic arm 208 is located at position station 232 and is configured to move in the direction of arrow 236 to reach different positioning stations.

Further, each of the robotic arms is able to only reach a portion of fuselage section 204 for machining operations in the different positioning stations. In these illustrative examples, the operations manager can identify an ordered sequence for performing machining operations that take into account clamp-up force specifications and the ability of each robotic arm to reach different portions of fuselage section 204 at different positioning stations. Further, the performance of the machining operations also may identify a path that reduces the number of position station changes for the robotic arms, reduces the number of tool changes for the robotic arms, or some other factor affecting the time needed to perform the machining operations.

Figure 3A:
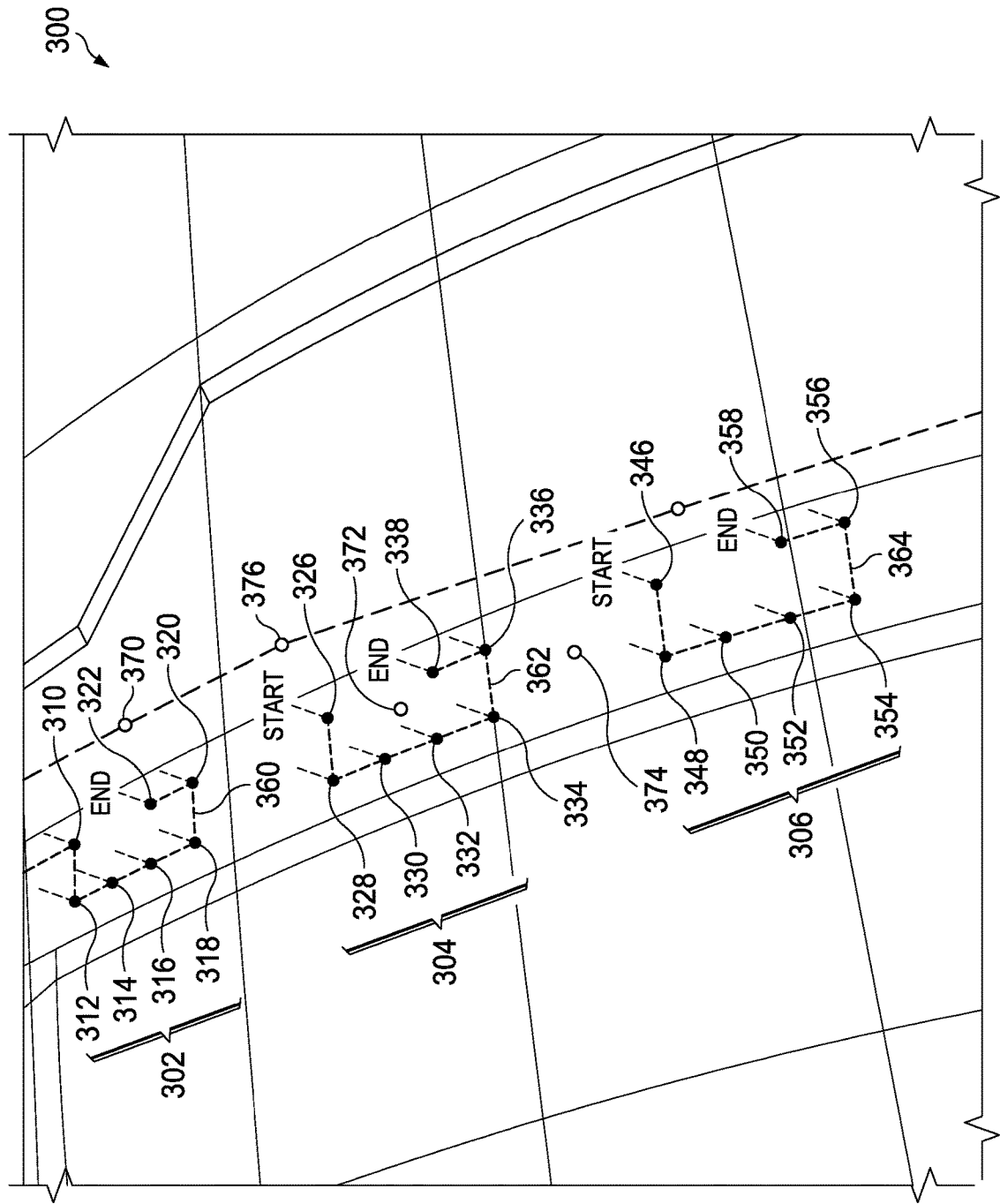
FIG. 3A is an illustration of locations for holes in a workpiece in accordance with an illustrative embodiment.

With reference now to FIG. 3A, an illustration of locations for holes in a workpiece is depicted in accordance with an illustrative embodiment. As depicted, workpiece 300 is an example of workpiece 110 in FIG. 1.

As depicted, workpiece 300 has hole locations in which machining operations are to be performed. Subsets of hole locations may be identified within the plurality of hole locations in workpiece 300, and may be assigned to each of robotic devices 106 in FIG. 1. In this illustrative example, these subsets of hole locations can be divided up into groupings comprising group 302, group 304, and group 306. The subsets of hole locations may include the number of holes of group 302, group 304, and group 306 in which hole locations are proximally located near each other.

As depicted, group 302 includes hole location 310, hole location 312, location 314, hole location 316, hole location 318, hole location 320, and hole location 322. Group 304 includes hole location 326, hole location 328, hole location 330, hole location 332, hole location 334, hole location 336, and hole location 338. As depicted, group 306 includes hole location 346, hole location 348, hole location 350, hole location 352, hole location 354, hole location 356, and hole location 358.

Each of the hole locations in the groups 302, 304, and 306 may have an associated constraint, such as a requirement to establish a clamp-up force within a given distance of the hole location before proceeding with machining operations to drill the hole and manufacturing operations to install a fastener in the hole. Accordingly, for each of groups 302, 304, and 306 of hole locations, the process may determine candidate locations among the pre-existing hole locations within each of the groups in which to install temporary fasteners 134, such that clamp-up constraints are satisfied for other proximally-located hole locations in the groups 302, 304, and 306. Each group can be considered a subset of the hole locations. The candidate locations among the pre-existing hole locations in the groups may be determined and selected such that an optimum path can be determined for the robotic device to move along the other hole locations in the groups (for which the clamp-up constraint is satisfied), such that the robotic devices 106 move from hole location to hole location within each group with minimal travel distance. The process may determine, for each of robotic devices 106, an optimal path 128 that has a near-minimum distance for traversing hole locations in each group, and for spanning the subset of hole locations from a start location to a finish location, for example.

In this illustrative example, path 360 is determined for the hole locations for group 302. Path 362 is determined for the hole locations in group 304. Path 364 is determined for the hole locations in group 306. In this illustrative example, each of these paths can be considered an optimal path that is performed by the same or different robotic device. In another illustrative example, each of these paths can be a portion of a single optimal path that is divided up into portions for machining by two or more robotic devices.

In this illustrative example, workpiece 300 also includes temporary hole location 370, temporary hole location 372, temporary hole location 374, and temporary hole location 376. A set of temporary fasteners can be identified for placement in these temporary hole locations. The set can be determined based on a minimum number of temporary fasteners that can be installed to provide an optimal path for machining operations on workpiece 300. In some cases, the set may be a null set. For example, an initial hole that is part of the holes identified for machining may provide the clamp-up force needed to meet clamp-up force specifications in a manner that provides for the optimal path for performing machining operations on workpiece 300.

Figure 3B:
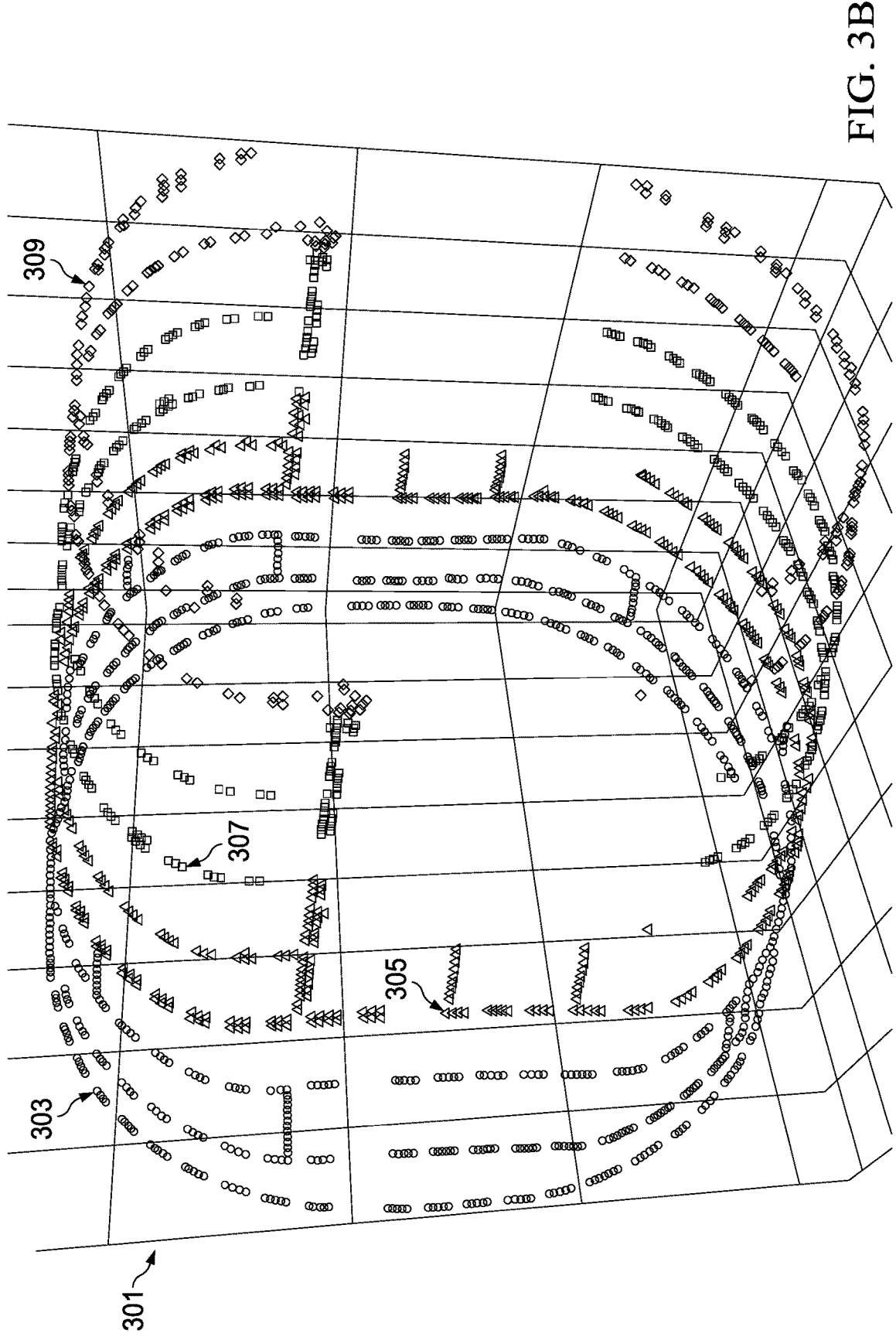
FIG. 3B is an illustration of a plurality of hole locations in accordance with an illustrative embodiment.

With reference next to FIG. 3B, an illustration of a plurality of hole locations is depicted in accordance with an illustrative embodiment. As depicted, the plurality of hole locations 301 is examples of hole locations 124 for workpiece 110 in FIG. 1. As depicted, the plurality of hole locations 301 are for a fuselage section of an aircraft.

In this illustrative example, the plurality of hole locations 301 are grouped into subsets 303, 305, 307, and 309 of the plurality of hole locations 301. Each subset of the plurality of hole locations 301 can be assigned to a robotic device in a number of robotic devices to perform operations for subsets 303, 305, 307, and 309 of the plurality of hole locations 301.

For example, a first robotic device can be assigned to subset 303, a second robotic device can be assigned to subset 305, a third robotic device can be assigned to subset 307, and a fourth robotic device can be assigned to subset 309. In these illustrative examples, the robotic devices can simultaneously perform machining operations or perform the machining operations sequentially, depending on the definition of the path and clamp-up force specifications of the order in which the plurality of hole locations 301 is to be formed.

In this illustrative example, the hole locations in each subset is shown as being in a single contiguous section or area. In other illustrative examples, a subset of holes may be non-contiguous. The operations performed at the plurality of hole locations 301 can include other operations in addition to or in place of machining operations to form holes. For example, fastener installation operations, inspections, and other suitable operations can be performed at the plurality of hole locations 301.

In this illustrative example, an ordered sequence can be identified for performing machining operations at the plurality of hole locations 301. The ordered sequence can be used to determine an optimal path that is output in the form of robotic control files. Each file can include a portion of the optimal path. The instructions in the robotic control files can coordinate the robotic devices such that the robotic devices cause the plurality of hole locations 301 to be machined in the ordered sequence. For example, a first robotic device may machine a first portion of the holes with a second robotic device machining a second portion of the holes after the first robotic device has completed machining the first portion of the holes in the ordered sequence. In this example, robotic devices can be positioned outside of the fuselage to perform the machining operations on the fuselage to form the holes in the plurality of hole locations 301.

The illustrations of FIG. 2, FIG. 3A, and FIG. 3B are presented for illustrating one manner in which an object can be manufactured and is not meant to limit the manner in which another illustrative example can be implemented. For example, other groupings of hole locations may be present. For example, instead of three groupings, all of the holes may be considered part of a single grouping in which the machining operation is performed by a single robotic device.

Figure 4:
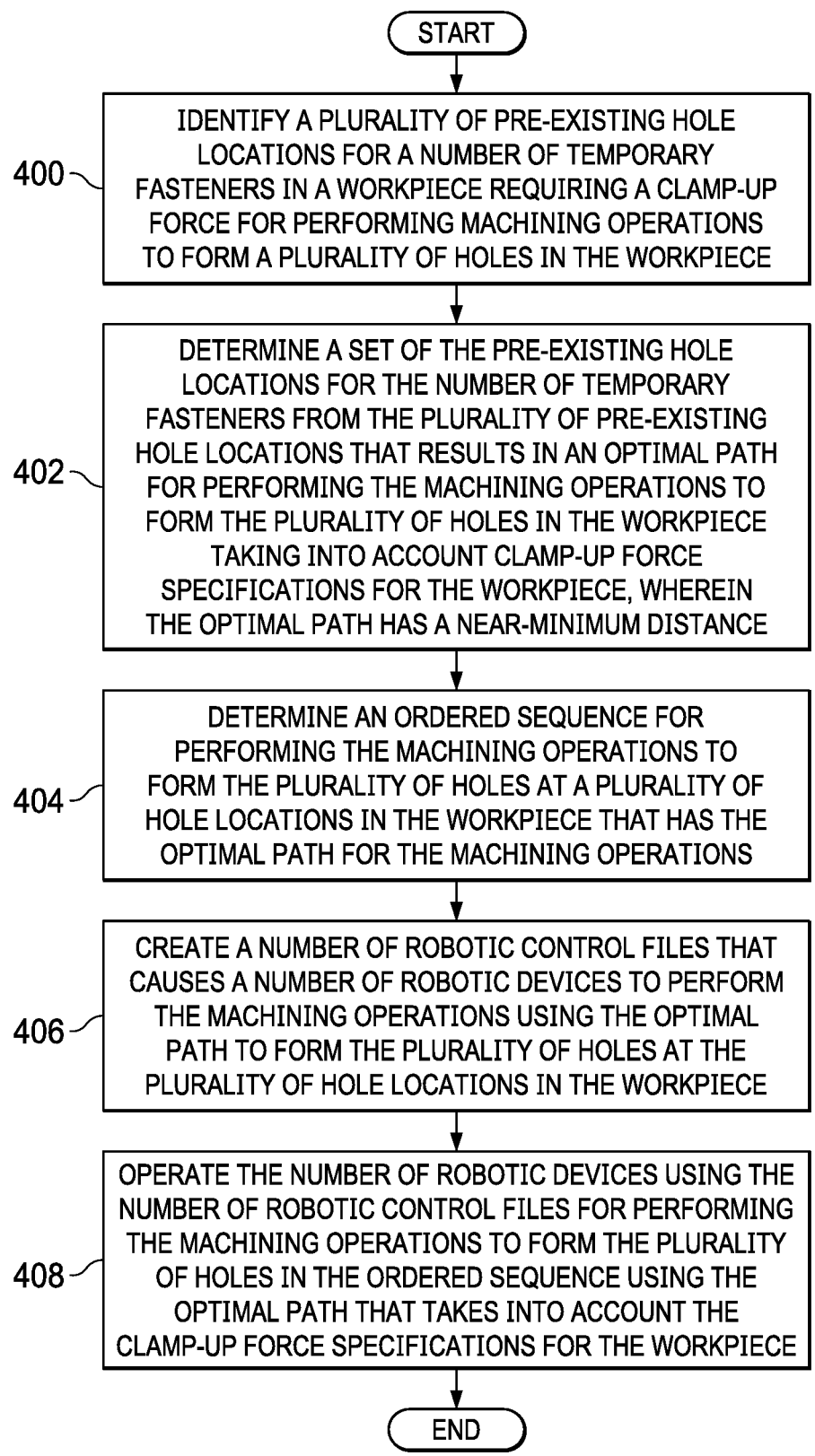
FIG. 4 is an illustration of a flowchart of a process for implementing machining operations in accordance with an illustrative embodiment.

Turning next to FIG. 4, an illustration of a flowchart of a process for implementing machining operations is depicted in accordance with an illustrative embodiment. The process illustrated in FIG. 4 can be implemented in at least one of hardware or software. When software is used, the operations in the flowchart can be implemented using program code that can be run by one or more processor units in a computer system. In one illustrative example, the process can be implemented in operations manager 120 in computer system 118 in FIG. 1.

The process begins by identifying a plurality of pre-existing hole locations for a number of temporary fasteners in a workpiece requiring a clamp-up force for performing machining operations to form a plurality of holes in the workpiece (operation 400). The process determines a set of the pre-existing hole locations for the number of temporary fasteners from the plurality of pre-existing hole locations that results in an optimal path for performing the machining operations to form the plurality of holes in the workpiece taking into account clamp-up force specifications for the workpiece, wherein the optimal path has a near-minimum distance (operation 402).

The process determines an ordered sequence for performing the machining operations to form the plurality of holes at a plurality of hole locations in the workpiece that has the optimal path for the machining operations (operation 404). In operation 404, the ordered sequence can be used to determine the path for performing machining operations. The process can determine the ordered sequence by determining a subset of the plurality of hole locations for each of the number of robotic devices to perform the machining operations that will result in the optimal path having a near-minimum distance for each subset of the plurality of hole locations, as determined by iteratively calculating a distance across a span of candidate hole locations that meet constraints to determine an optimum ordered sequence for performing the machining operations for the subset of the plurality of hole locations.

In operation 404, the distance across a span of the hole locations is iteratively calculated to determine a path having a near-minimum distance. In this illustrative example, the span of the hole locations is the distance between all of the hole locations being considered for a particular path. These calculations take into account the clamp-up forces for machining holes as specified for the workpiece.

The process creates a number of robotic control files that causes a number of robotic devices to perform the machining operations using the optimal path to form the plurality of holes at the plurality of hole locations in the workpiece (operation 406). The process operates the number of robotic devices using the number of robotic control files for performing the machining operations to form the plurality of holes in the ordered sequence using the optimal path that takes into account the clamp-up force specifications for the workpiece (operation 408). The process terminates thereafter.

Figure 5:
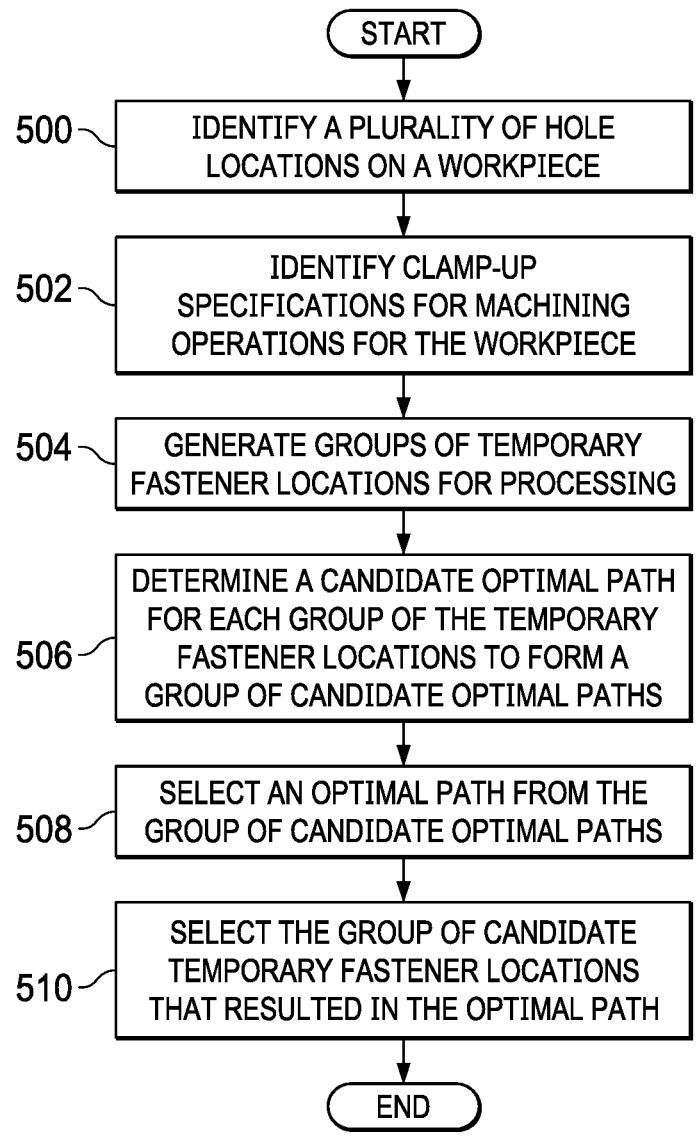
FIG. 5 is an illustration of a flowchart of a process for identifying an ordered sequence for performing machining operations in accordance with an illustrative embodiment.

With reference next to FIG. 5, an illustration of a flowchart of a process for identifying an ordered sequence for performing machining operations is depicted in accordance with an illustrative embodiment. The process illustrated in FIG. 5 can be implemented in at least one of hardware or software. When software is used, the operations in the flowchart can be implemented using program code that can be run by one or more processor units in a computer system. In one illustrative example, the process can be implemented in operations manager 120 in computer system 118 in FIG. 1.

The process begins by identifying a plurality of hole locations on a workpiece (operation 500). In operation 500, the hole locations are for the installation of fasteners to connect components in the workpiece to each other.

The process identifies clamp-up specifications for machining operations for the workpiece (operation 502). The process generates groups of temporary fastener locations for processing (operation 504). In operation 504, all of the possible different combinations of temporary fastener locations are generated for this illustrative example. These temporary fastener locations can be pre-existing hole locations. The holes for the pre-existing hole locations may have already been formed or, in some examples, the holes in these locations for the temporary fasteners can be formed as needed prior to machining the workpiece to form the holes, or the holes in the locations for the temporary fasteners can be formed during the machining process to form the holes.

The process determines a candidate optimal path for each group of the temporary fastener locations to form a group of candidate optimal paths (operation 506). As used herein, "a group of," when used with reference items, means one or more items. For example, "a group of temporary fastener locations" is one or more of temporary fastener locations.

The process selects an optimal path from the group of candidate optimal paths (operation 508). The process selects the group of candidate temporary fastener locations that resulted in the optimal path (operation 510). In operation 510, the process identifies the temporary fastener locations in which the temporary fasteners will be installed from the group that yielded the candidate optimal path that was selected for use as the off. The process terminates thereafter.

Figure 6:
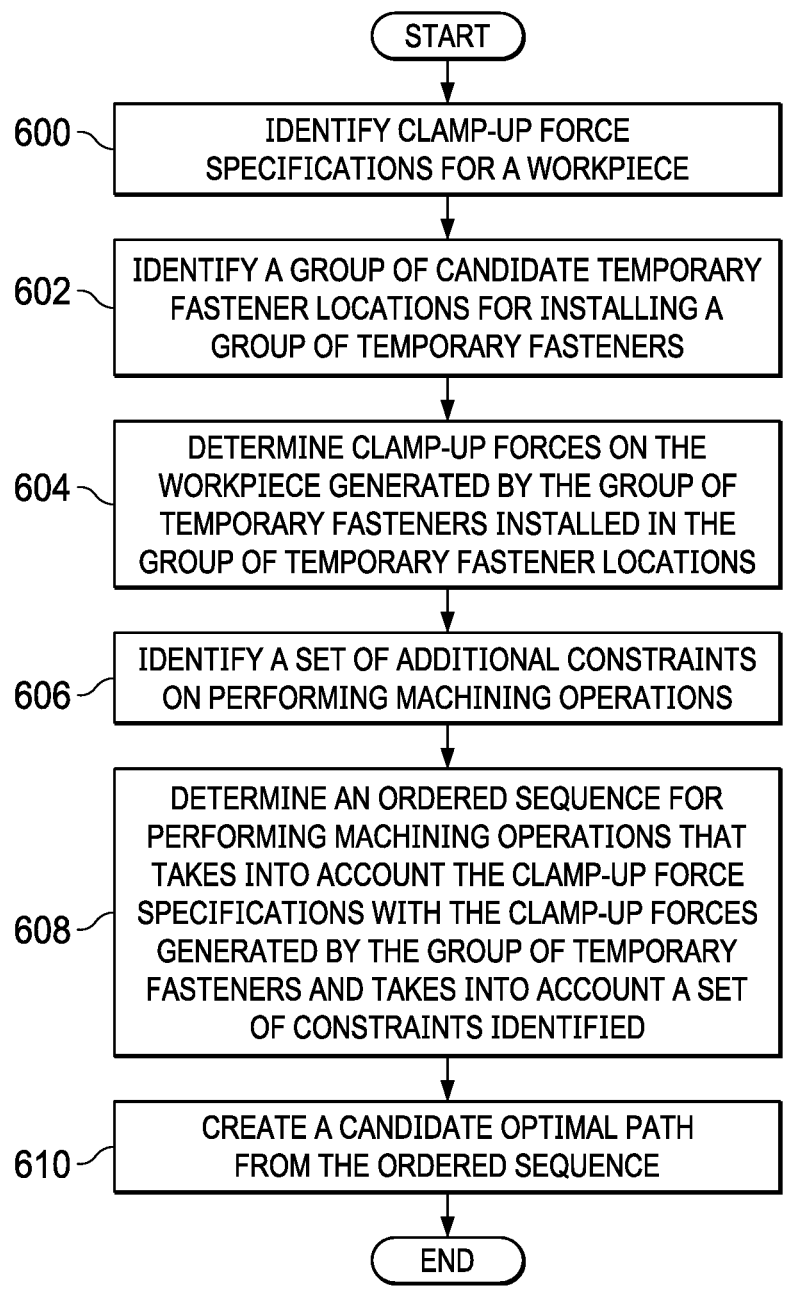
FIG. 6 is an illustration of a flowchart of a process for determining a candidate optimal path in accordance with an illustrative embodiment.

Turning next to FIG. 6, an illustration of a flowchart of a process for determining a candidate optimal path is depicted in accordance with an illustrative embodiment. The process illustrated in FIG. 6 is an example of an implementation for operation 506 in FIG. 5.

The process begins by identifying clamp-up force specifications for a workpiece (operation 600). The process identifies a group of candidate temporary fastener locations for installing a group of temporary fasteners (operation 602). The process determines clamp-up forces on the workpiece generated by the group of temporary fasteners installed in the group of temporary fastener locations (operation 604). The process identifies a set of additional constraints on performing machining operations (operation 606). The set of additional constraints includes a constraint on at least one of a distance, a time, a number of positioning stations allowed for robotic devices, minimizing tool changes, or other constraints.

The process determines an ordered sequence for performing the machining operations that takes into account the clamp-up force specifications with the clamp-up forces generated by the group of temporary fasteners and takes into account a set of constraints identified (operation 608). The process then creates a candidate optimal path from the ordered sequence (operation 610). The process terminates thereafter. This process can be formed for each group of candidate temporary fastener locations to generate multiple candidate optimal paths for consideration.

Figure 7:
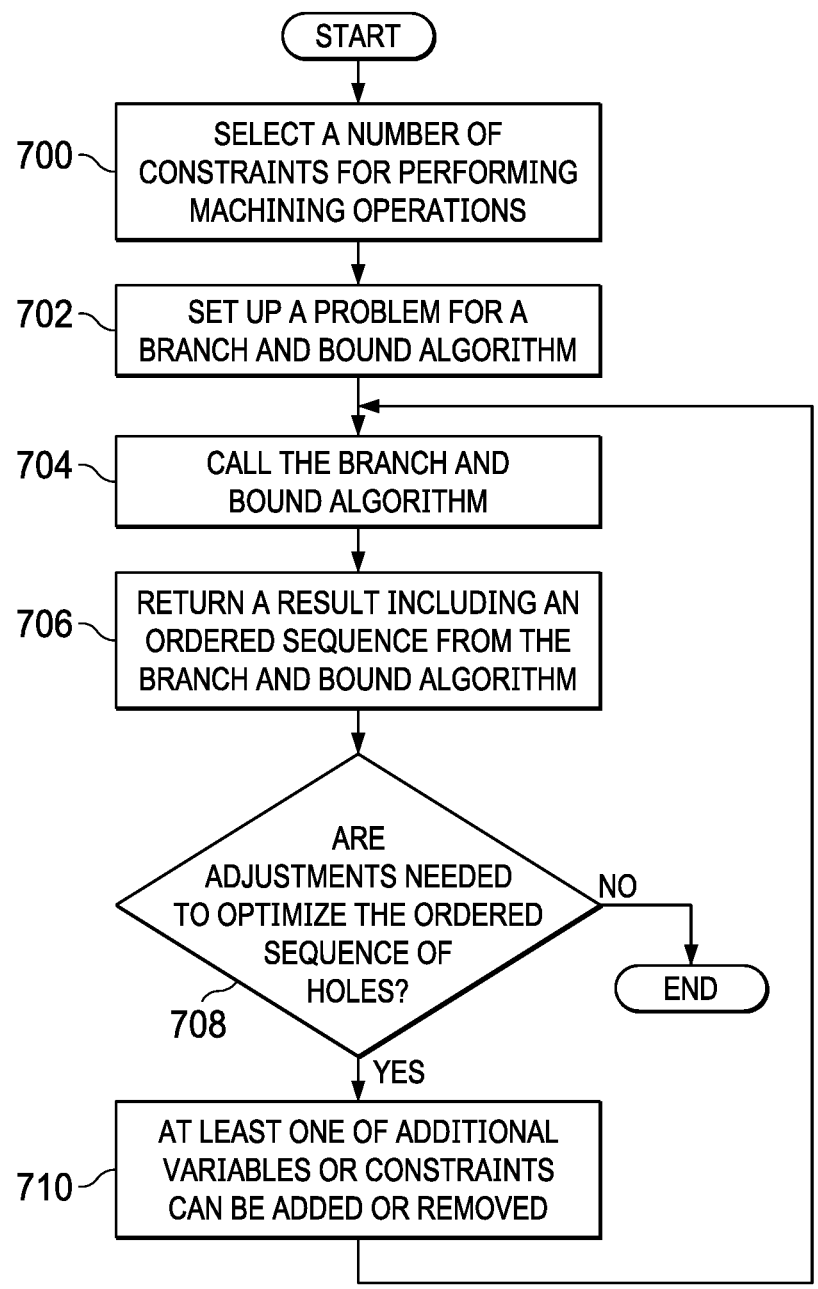
FIG. 7 is an illustration of a flowchart of a process for identifying an ordered sequence for performing machining operations at hole locations in accordance with an illustrative embodiment.

With reference now to FIG. 7, an illustration of a flowchart of a process for identifying an ordered sequence for performing machining operations at hole locations is depicted in accordance with an illustrative embodiment. The process illustrated in FIG. 7 is an example of one manner in which operation 608 in FIG. 6 can be implemented.

The process begins by selecting a number of constraints for performing machining operations (operation 700). The process sets up a problem for a branch and bound algorithm (operation 702). The problem is set up by defining variables and constraints for a branch and bound algorithm. The branch and bound (BB) algorithm is currently available for solving discrete combinatorial optimization problems. The problem posed in this example is to find the shortest time required to move between all of the locations for the holes taking into account one or more constraints.

The branch and bound algorithm is used to solve the problem of finding the shortest time required to move between all of the holes on the workpiece. The branch and bound algorithm accomplishes this by creating a search space of candidate solutions which form a rooted tree structure. Nodes in the tree represent variables and their ability to assume the value of either 0 or 1. Two branches are created for each scenario.

The manufacturing and logical constraints of the process determine the possible values for each variable at each node. In the illustrative example, the constraints include clamp-up forces specified for the workpiece. Other constraints may be, for example, tool changes, position stations, or other suitable constraints for the workpiece.

All possible solutions can be enumerated in this manner, yet the amount of time needed is greater than desired. The branch and bound algorithm avoids much of the enumeration by recursively evaluating the upper and lower bounds on the objective function in the branch and bound algorithm at each node.

These bounds are compared to the current best bound or solution by the branch and bound algorithm. If a particular branch of the tree shows to have a higher bound than the current best solution, and thus a higher cost, the branch and bound algorithm can ignore all possible scenarios for that entire branch and look elsewhere. The branch and bound algorithm continues by recursively pruning the tree until an optimal solution is arrived at that satisfies all of the constraints.

The process calls the branch and bound algorithm (operation 704). A result including an ordered sequence is returned from the branch and bound algorithm (operation 706). In operation 706, the branch and bound algorithm returns the ordered sequence for machining holes along with auxiliary outputs regarding the soundness of variables and which constraints are most relevant to the solution specifying the ordered sequence.

A determination is made as to whether adjustments are needed to optimize the ordered sequence of holes (operation 708). For example, the process can review results to see how well the results meet constraints such as clamp-up force specifications. Results can also be compared against other constraints that may be specified to determine if changes need to be made.

In operation 708, if adjustments are needed, at least one of additional variables or constraints can be added or removed (operation 710). The process then returns to operation 704. If adjustments are not needed in operation 708, the process terminates. In this manner, this process can be repeated until a minimum cost for a path to machine holes is obtained that meets desired constraints.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step.

For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
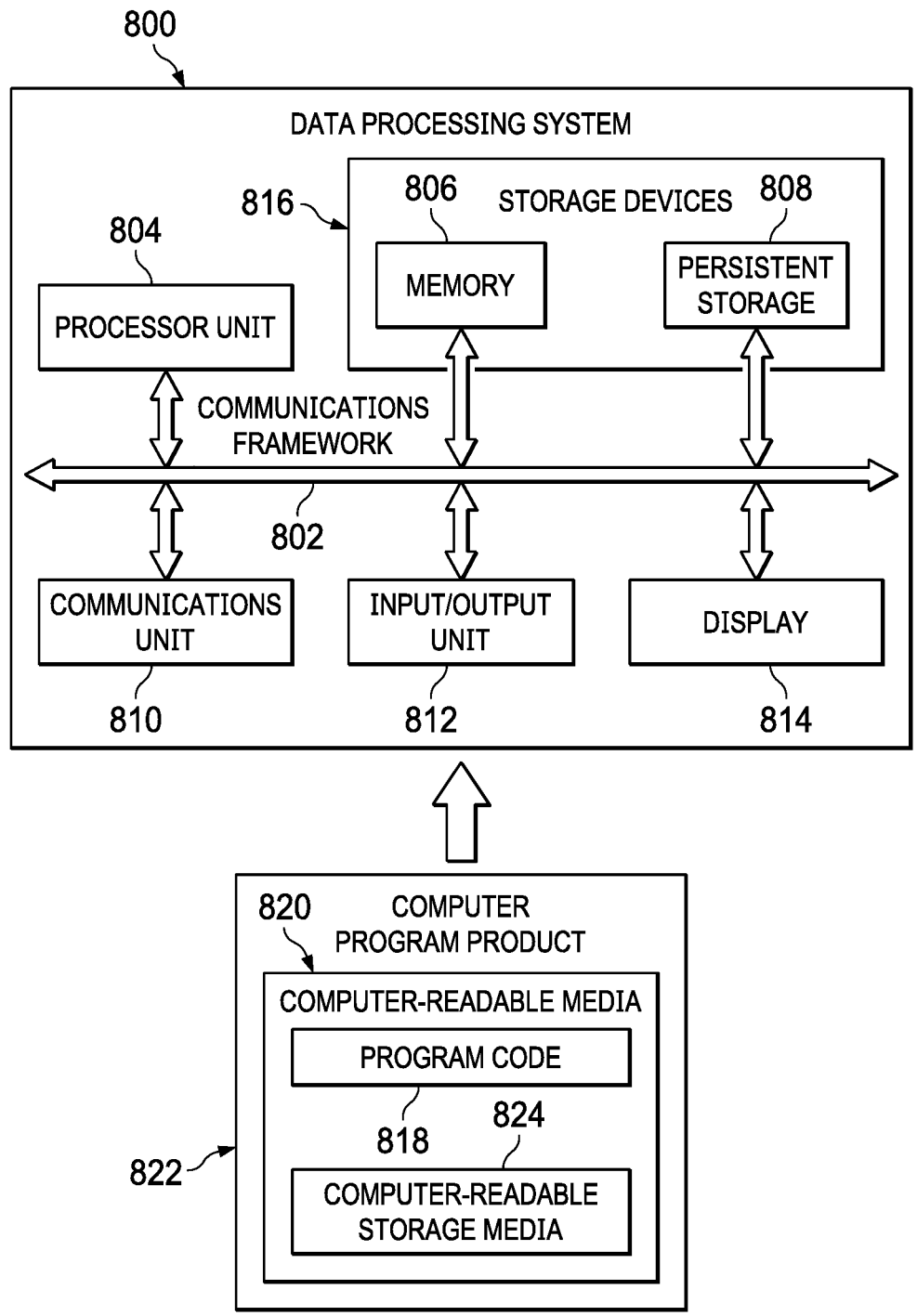
FIG. 8 is an illustration of a block diagram of a data processing system in accordance with an illustrative embodiment.

Turning now to FIG. 8, an illustration of a block diagram of a data processing system is depicted in accordance with an illustrative embodiment. Data processing system 800 may be used to implement computer system 118 in FIG. 1, robotic devices 106 in FIG. 1, robotic arm 206 in FIG. 2, robotic arm 208 in FIG. 2, robotic arm 210 in FIG. 2, and robotic arm 212 in FIG. 2. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random-access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid state hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818. Alternatively, program code 818 may be transferred to data processing system 800 using a computer-readable signal media.

The computer-readable signal media may be, for example, a propagated data signal containing program code 818. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

Figure 9:
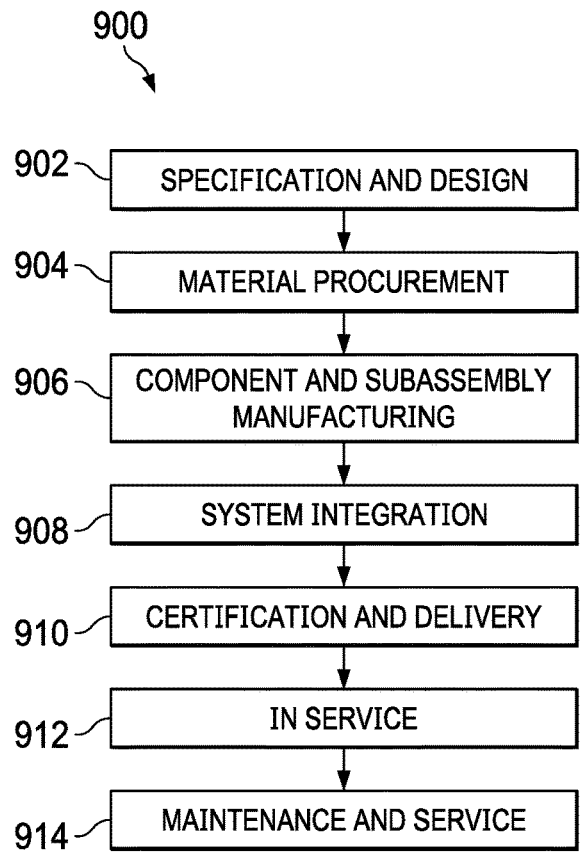
FIG. 9 is an illustration of a block diagram of an aircraft manufacturing and service method in accordance with an illustrative embodiment.
Figure 10:
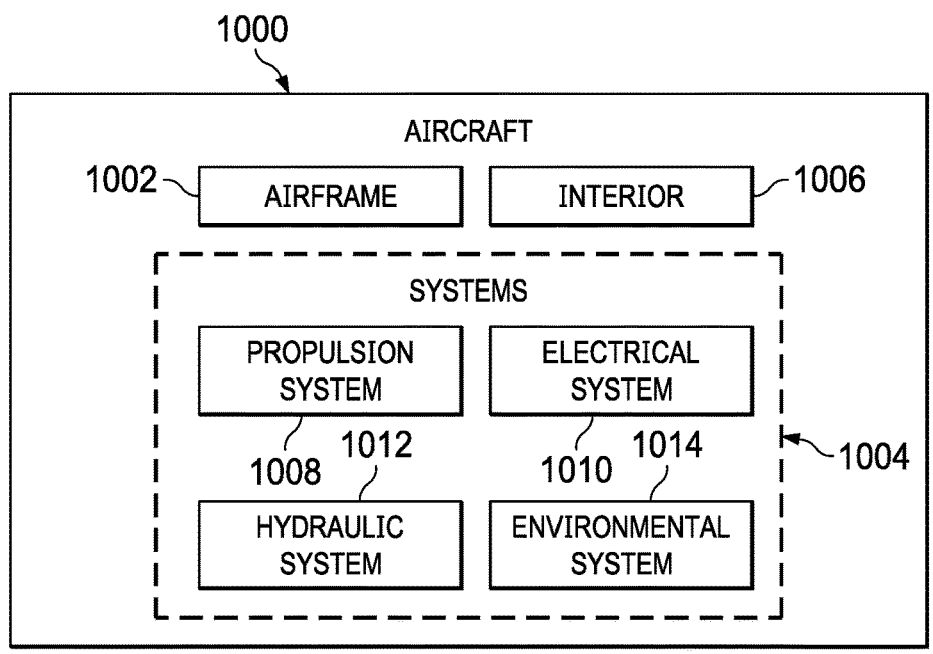
FIG. 10 is an illustration of a block diagram of an aircraft in which an illustrative embodiment may be implemented.

Illustrative embodiments of the disclosure may be described in the context of aircraft manufacturing and service method 900 as shown in FIG. 9 and aircraft 1000 as shown in FIG. 10. Turning first to FIG. 9, an illustration of a block diagram of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of a block diagram of an aircraft is depicted in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included.

Although an aerospace example is shown, different illustrative embodiments may be applied to other industries, such as the automotive industry. Apparatuses and methods embodied herein may be employed during at least one of the stages of aircraft manufacturing and service method 900 in FIG. 9.

In one illustrative example, an operations manager can manage machining operations performed on workpieces for components or subassemblies produced in component and subassembly manufacturing 906 in FIG. 9 may be fabricated or manufactured using an operations manager to manage machining operations performed on workpieces for components in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9.

One or more apparatus embodiments, method embodiments, or a combination thereof may be utilized while aircraft 1000 is in service 912, during maintenance and service 914 in FIG. 9, or both. The use of a number of the different illustrative embodiments may substantially expedite the assembly of aircraft 1000, reduce the cost of aircraft 1000, or both expedite the assembly of aircraft 1000 and reduce the cost of aircraft 1000.

Figure 11:
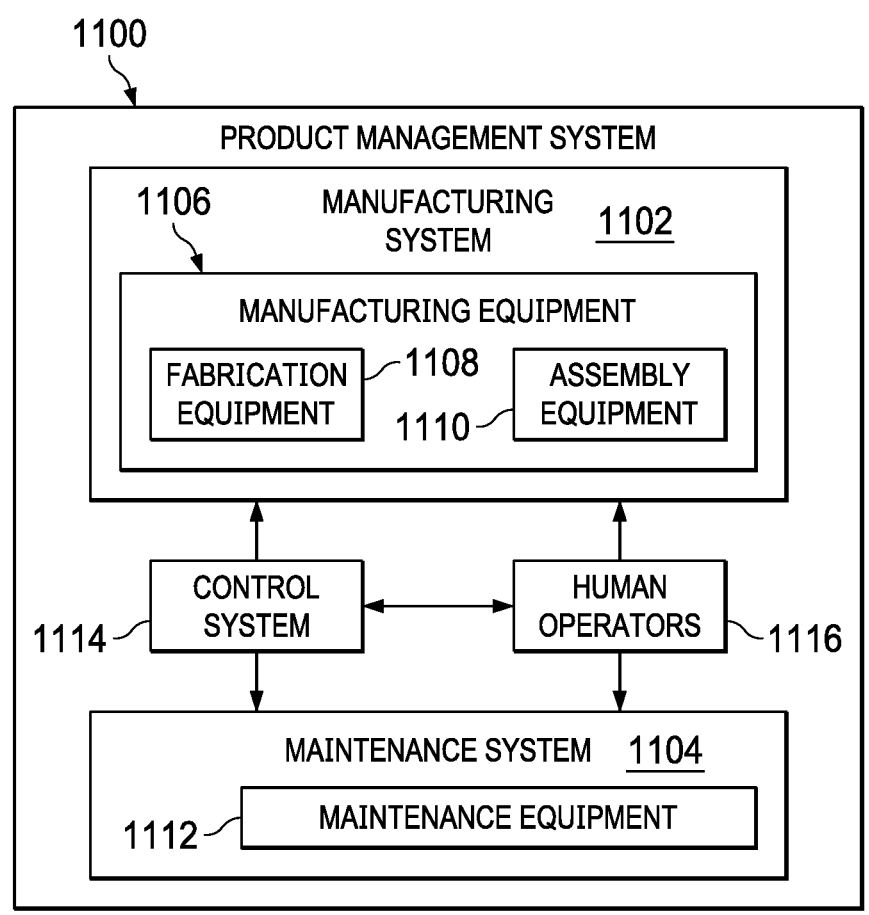
FIG. 11 is an illustration of a block diagram of a product management system in accordance with an illustrative embodiment.

Turning now to FIG. 11, an illustration of a block diagram of a product management system is depicted in accordance with an illustrative embodiment. Product management system 1100 is a physical hardware system. In this illustrative example, product management system 1100 may include at least one of manufacturing system 1102 or maintenance system 1104.

Manufacturing system 1102 is configured to manufacture products, such as aircraft 1000 in FIG. 10. As depicted, manufacturing system 1102 includes manufacturing equipment 1106. Manufacturing equipment 1106 includes at least one of fabrication equipment 1108 or assembly equipment 1110.

Fabrication equipment 1108 is equipment that may be used to fabricate components for parts used to form aircraft 1000. For example, fabrication equipment 1108 may include machines and tools. These machines and tools may be at least one of a drill, a hydraulic press, a furnace, a mold, a composite tape laying machine, a vacuum system, a lathe, or other suitable types of equipment. Fabrication equipment 1108 may be used to fabricate at least one of metal parts, composite parts, semiconductors, circuits, fasteners, ribs, skin panels, spars, antennas, or other suitable types of parts.

Assembly equipment 1110 is equipment used to assemble parts to form aircraft 1000. In particular, assembly equipment 1110 may be used to assemble components and parts to form aircraft 1000. Assembly equipment 1110 also may include machines and tools. These machines and tools may be at least one of a robotic arm, a crawler, a faster installation system, a rail-based drilling system, or a robot. Assembly equipment 1110 may be used to assemble parts such as seats, horizontal stabilizers, wings, engines, engine housings, landing gear systems, and other parts for aircraft 1000.

In this illustrative example, maintenance system 1104 includes maintenance equipment 1112. Maintenance equipment 1112 may include any equipment needed to perform maintenance on aircraft 1000. Maintenance equipment 1112 may include tools for performing different operations on parts on aircraft 1000. These operations may include at least one of disassembling parts, refurbishing parts, inspecting parts, reworking parts, manufacturing replacement parts, or other operations for performing maintenance on aircraft 1000. These operations may be for routine maintenance, inspections, upgrades, refurbishment, or other types of maintenance operations.

In the illustrative example, maintenance equipment 1112 may include ultrasonic inspection devices, x-ray imaging systems, vision systems, drills, crawlers, and other suitable device. In some cases, maintenance equipment 1112 may include fabrication equipment 1108, assembly equipment 1110, or both to produce and assemble parts that may be needed for maintenance.

Product management system 1100 also includes control system 1114. Control system 1114 is a hardware system and may also include software or other types of components. Control system 1114 is configured to control the operation of at least one of manufacturing system 1102 or maintenance system 1104. In particular, control system 1114 may control the operation of at least one of fabrication equipment 1108, assembly equipment 1110, or maintenance equipment 1112.

The hardware in control system 1114 may be using hardware that may include computers, circuits, networks, and other types of equipment. The control may take the form of direct control of manufacturing equipment 1106. For example, robots, computer-controlled machines, and other equipment may be controlled by control system 1114. In other illustrative examples, control system 1114 may manage operations performed by human operators 1116 in manufacturing or performing maintenance on aircraft 1000. For example, control system 1114 may assign tasks, provide instructions, display models, or perform other operations to manage operations performed by human operators 1116.

In these illustrative examples, operations manager 120 in computer system 118 in FIG. 1 may be implemented in control system 1114 to manage at least one of the manufacturing or maintenance of aircraft 1000 in FIG. 10. For example, operations manager 120 can manage machining operations performed as part of manufacturing parts or assembling parts for use in manufacturing or maintenance of aircraft 1000.

In the different illustrative examples, human operators 1116 may operate or interact with at least one of manufacturing equipment 1106, maintenance equipment 1112, or control system 1114. This interaction may be performed to manufacture aircraft 1000.

Of course, product management system 1100 may be configured to manage other products other than aircraft 1000. Although product management system 1100 has been described with respect to manufacturing in the aerospace industry, product management system 1100 may be configured to manage products for other industries. For example, product management system 1100 can be configured to manufacture products for the automotive industry as well as any other suitable industries.

Thus, the illustrative examples provide one or more technical solutions that overcome a technical problem with efficiently machining holes extending through components in a workpiece. The operations manager can identify an optimal path for performing machining operations for holes in the workpiece. This optimal path can reduce at least one of time, distance, tool changes, or other parameters that may reduce efficiency in fabricating the workpiece.

In one illustrative example, a set of pre-existing hole locations is identified for installing temporary fasteners. The selection of the set of pre-existing hole locations is made to enable identifying an optimal path for performing machining operations on a workpiece. This optimal path takes into account clamp-up specifications for machining holes in the workpiece.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for implementing machining operations for a workpiece, the method comprising:
   identifying a plurality of pre-existing hole locations for a number of temporary fasteners in the workpiece requiring a clamp-up force for performing the machining operations to form a plurality of holes in the workpiece;
   determining a set of pre-existing hole locations for the number of temporary fasteners from the plurality of pre-existing hole locations that results in an optimal path for performing the machining operations to form the plurality of holes in the workpiece taking into account clamp-up force specifications for the workpiece, wherein the optimal path has a near-minimum distance;
   determining an ordered sequence for performing the machining operations to form the plurality of holes at a plurality of hole locations in the workpiece that has the optimal path for the machining operations;
   creating a number of robotic control files that causes a number of robotic devices to perform the machining operations using the optimal path to form the plurality of holes at the plurality of hole locations in the workpiece; and
   operating the number of robotic devices using the number of robotic control files for performing the machining operations to form the plurality of holes in the ordered sequence using the optimal path that takes into account the clamp-up force specifications for the workpiece.

2. The method of claim 1 further comprising:
   determining a starting hole location on the workpiece when the set of pre-existing hole locations is an empty set, wherein installing a fastener in a starting hole at the starting hole location results in the optimal path for the machining operations to form the plurality of holes in the workpiece in which the optimal path has the near-minimum distance; and
   wherein creating the number of robotic control files comprises:
      creating the number of robotic control files that causes the number of robotic devices to perform the machining operations using the optimal path to form the starting hole and the plurality of holes in the workpiece.

3. The method of claim 1, wherein the step of determining the set of pre-existing hole locations for the number of temporary fasteners comprises:
   determining the set of pre-existing hole locations at which a minimum number of temporary fasteners are to be installed, by determining a subset of the plurality of hole locations for each of the number of robotic devices to perform machining operations that will result in the optimal path having a near-minimum distance for each determined subset of the plurality of hole locations, wherein determining the subset of the plurality of hole locations comprises iteratively calculating a distance across a span of hole locations that meet constraints.

4. The method of claim 3 further comprising:
   installing the minimum number of temporary fasteners in a set of pre-existing holes at the set of pre-existing hole locations.

5. The method of claim 1 further comprising:
   performing the machining operations using a plurality of robotic devices with the number of robotic control files, wherein a robotic device in the number of robotic devices performs the machining operations on a portion of the optimal path assigned to the robotic device in a robotic control file in the number of robotic control files for the robotic device.

6. The method of claim 1, wherein creating the number of robotic control files comprises:
   creating the number of robotic control files that causes the number of robotic devices to perform the machining operations using the optimal path to form the plurality of holes and install a plurality of fasteners in the plurality of holes in the workpiece.

7. The method of claim 1, wherein the workpiece is a fuselage assembly with layers.

8. The method of claim 1, wherein the number of robotic control files is a number of computer numerical control programs.

9. The method of claim 1, wherein the optimal path reduces at least one of a distance, a number of tool changes, or the number of robotic devices.

10. The method of claim 1, wherein the workpiece is for an object selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a house, a manufacturing facility, a building, a wing, an engine housing, a fuselage, and a skin panel.

11. A manufacturing system comprising
a computer system;
an operations manager running on the computer system, wherein the operations manager identifies a plurality of pre-existing hole locations for a number of temporary fasteners in a workpiece requiring a clamp-up force for performing machining operations to form a plurality of holes in the workpiece; determines a set of pre-existing hole locations for the number of temporary fasteners from the plurality of pre-existing hole locations that results in an optimal path for performing the machining operations to form the plurality of holes at a plurality of hole locations in the workpiece, wherein the optimal path has a near-minimum distance; determines an ordered sequence for performing the machining operations to form the plurality of holes in the workpiece that has the optimal path for the machining operations; and creates a number of robotic control files that causes a number of robotic devices to perform the machining operations using the optimal path to form the plurality of holes at the plurality of hole locations in the workpiece; and
the number of robotic devices running the number of robotic control files for performing the machining operations to form the plurality of holes in the ordered sequence using the optimal path that takes into account clamp-up force specifications for the workpiece.

12. The manufacturing system of claim 11, wherein the operations manager determines a starting hole location on the workpiece when the set of pre-existing hole locations is an empty set, wherein installing a fastener in a starting hole at the starting hole location results in the optimal path for the machining operations to form the plurality of holes in the workpiece in which the optimal path has the near-minimum distance and creates the number of robotic control files that causes the number of robotic devices to perform the machining operations using the optimal path to form the starting hole and the plurality of holes in the workpiece.

13. The manufacturing system of claim 11, wherein the operations manager is configured to determine a set of pre-existing hole locations at which a minimum number of temporary fasteners are to be installed, determine a subset of the plurality of hole locations for each of the number of robotic devices to perform machining operations that will result in the optimal path having the near-minimum distance for each determined subset of the plurality of hole locations, wherein determining the subset of the plurality of hole locations comprises iteratively calculating a distance across a span of hole locations that meet constraints.

14. The manufacturing system of claim 11, wherein the operations manager installs a minimum number of temporary fasteners in a set of pre-existing holes at the set of pre-existing hole locations.

15. The manufacturing system of claim 11, wherein the operations manager performs the machining operations using a plurality of robotic devices using the number of robotic control files, wherein a robotic device in the number of robotic devices performs the machining operations on a portion of the optimal path assigned to the robotic device in a robotic control file in the number of robotic control files for the robotic device.

16. The manufacturing system of claim 11, wherein in creating the number of robotic control files, the operations manager creates the number of robotic control files that causes the number of robotic devices to perform the machining operations using the optimal path to form the plurality of holes and install a plurality of fasteners in the plurality of holes in the workpiece.

17. The manufacturing system of claim 11, wherein the workpiece is a fuselage assembly with layers.

18. The manufacturing system of claim 11, wherein the number of robotic control files is a number of numeric control programs.

19. The manufacturing system of claim 11, wherein the optimal path reduces at least one of a distance of the optimal path, a number of tool changes, or the number of robotic devices.

20. The manufacturing system of claim 11, wherein the workpiece is for an object selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a house, a manufacturing facility, a building, a wing, an engine housing, a fuselage, and a skin panel.

* * * * *